T. L. GRAY.
WHEEL LOCKING DEVICE.
APPLICATION FILED OCT. 6, 1914.

1,171,335.

Patented Feb. 8, 1916.

Witnesses:
Frank H. Fowler
Winifred Knoph

Inventor
Thomas L. Gray
By Fred P. Gorin
Attorney

UNITED STATES PATENT OFFICE.

THOMAS L. GRAY, OF SEATTLE, WASHINGTON, ASSIGNOR OF ONE-HALF TO GILBERT ALONZO KENT, OF KING COUNTY, WASHINGTON.

WHEEL-LOCKING DEVICE.

1,171,335.  Specification of Letters Patent.  Patented Feb. 8, 1916.

Application filed October 6, 1914. Serial No. 865,304.

*To all whom it may concern:*

Be it known that I, THOMAS L. GRAY, a citizen of the United States, and a resident of Seattle, in the county of King and State of Washington, have invented certain new and useful Improvements in Wheel-Locking Devices, of which the following is a full, true, and exact specification.

My invention relates to wheel locking devices, and has for its principal objects; to provide an improved means for locking or clamping car wheels to the rails upon which they rest, as is necessary in the operation of steam shovels, derricks, wreckers, etc., to prevent movement and to prevent the wheels from being raised from the track when the body of the car is being jacked up, said means to be cheap, simple and quickly detachable.

Further objects will appear as my device is more clearly set forth in the following specification, illustrated in the accompanying drawings and pointed out in the appended claims.

Figure 1:
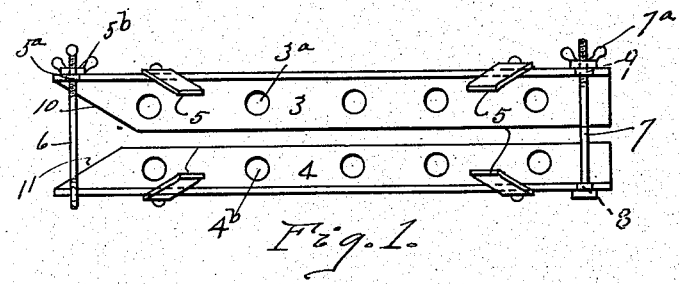
Figures 2, 3:
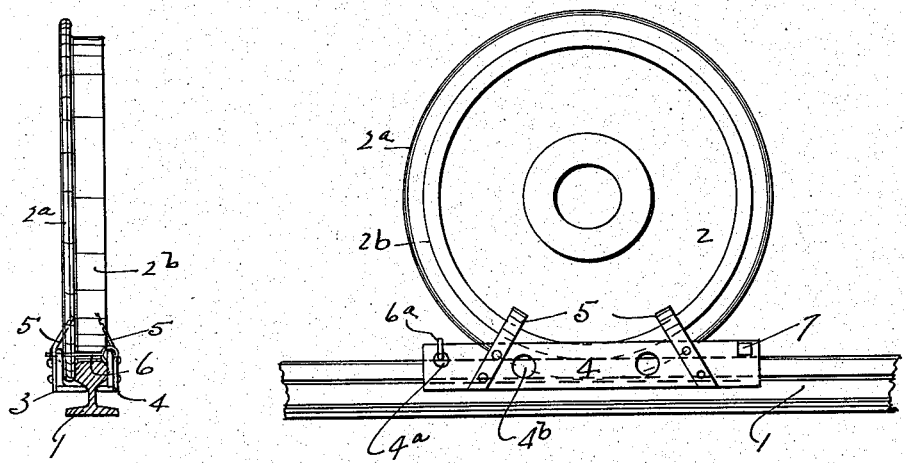

In the drawings, Figure 1 is a plan view of my device. Fig. 2 is a side elevation of same shown in an operative position on a wheel and rail. Fig. 3 is an end elevation of Fig. 2.

Referring more particularly to the drawings in which numeral 1 designates a fragment of a rail, 2, a wheel having a flange $2^a$ and tread $2^b$ as shown in Figs. 2 and 3. A pair of angle bars 3 and 4 which are provided with lugs 5, eye bolt 6 and bolt 7. The eye bolt 6 is fastened to one end of angle bar 4 by means of the eye of said bolt passing through a hole $4^a$ in said angle bar, the other end of the eye bolt passing through a hole $5^a$ in angle bar 3 and is provided with a thumb nut $5^b$. At the opposite ends of angle bars 3 and 4 are holes 8 and 9 respectively, through which bolt 7 passes. The bolt 7 is provided with a thumb nut $7^a$. The lugs 5 are bent in at the upper ends so as to project inside the outer lines of wheel 2 as shown in Fig. 3, thereby preventing the said wheel from rolling. Angle bars 3 and 4 are clipped at one end as shown at 10 and 11 respectively, to facilitate their attachment to the rail and wheel. It will be noted that the horizontal leg of angle bar 3, see Fig. 3, is wider than the corresponding leg of angle bar 4, the reason being that angle bar 3 is placed outside the wheel flange $2^a$, and, therefore, must be long enough to extend beneath said flange and take bearing against the rail. Angle bars 3 and 4 are perforated as at $3^a$ and $4^b$ respectively for the purpose of making the device as light as is consistent with strength. After the angle bars have had bolt 7 removed and eye bolt 6 loosened, the device is then ready to be placed in the position shown in Figs. 2 and 3, after which bolt 7 is replaced and tightened up by means of thumb nut $7^a$. The eye bolt 6 is also tightened up by means of thumb nut $5^b$. It will be understood that when the bolts 6 and 7 are tightened up that the angle bars 3 and 4 clamp the wheel flange $2^a$ against the side of rail 1 which holds the wheel frictionally from rotating; and the lugs 5 obviously hold the wheel against vertical movement with respect to the rail.

From the foregoing it is believed that the construction and operation of my device will be readily understood by others, and while I am aware that many minor changes in the construction and operation of my device will suggest themselves to anyone skilled in the art, I do not wish to be limited to the exact form shown.

Having described my invention, what I claim as new and desire to protect by Letters Patent, is—

1. In a device for clamping the wheels of a car to the rails, the combination of a pair of angle bars separably and adjustably connected at each of their ends, lugs on each of the angle bars, the upper end of each of which are adapted to project inside of the outer lines of the wheel, whereby movement of the wheel with respect to the rail is prevented when the said angle bars are adjusted.

2. In a device for clamping the wheels of a car to the rails, the combination of a pair of angle bars one leg of one of which is wider than its other leg, means for separably and adjustably connecting the ends of the angle bars to each other, the said means including an eye bolt, a straight bolt and a wing nut for each bolt, lugs on one leg of each of the angle bars which are bent inwardly so as to project inside of the outer lines of the wheel and which prevent vertical movement of the wheel with respect to the rail when the said nuts are screwed up on their respective bolts.

THOMAS L. GRAY.

Witnesses:
FRED P. GORIN,
WINIFRED KNOPH.